United States Patent [19]

Gokee

[11] Patent Number: 4,917,224
[45] Date of Patent: Apr. 17, 1990

[54] TRANSMISSION AND BRAKE INTERLOCK SYSTEM

[75] Inventor: Donald J. Gokee, Bowling Green, Ohio

[73] Assignee: Babcock Industries Inc., Fairfield, Conn.

[21] Appl. No.: 282,261

[22] Filed: Dec. 9, 1988

[51] Int. Cl.$^4$ .......................................... B60K 41/26
[52] U.S. Cl. ..................................... 192/4 A; 180/271
[58] Field of Search .............. 180/271, 272, 273, 278; 60/376, 582, 545, 550; 192/4 A; 74/473, 477

[56] References Cited

U.S. PATENT DOCUMENTS 4,096,930  6/1978  Viscardi ............................. 192/4 A
4,572,340  2/1986  Pierce ................................ 192/4 A
4,667,783  5/1987  Sugano et al. ..................... 192/4 A Primary Examiner—Richard A. Bertsch
Attorney, Agent, or Firm—Barnes, Kisselle, Raisch, Choate, Whittemore & Hulbert

[57] ABSTRACT

A transmission and brake interlock system comprising a lock member mounted for movement with the transmission shift lever on the transmission and an interlock between the brake pedal of the automotive vehicle and the lock member operable to prevent movement of the lock member and shifting of the transmission out of park position. When the brake pedal is depressed, the lock member is permitted to move and in turn the transmission lever to move to shift out of park position.

4 Claims, 1 Drawing Sheet

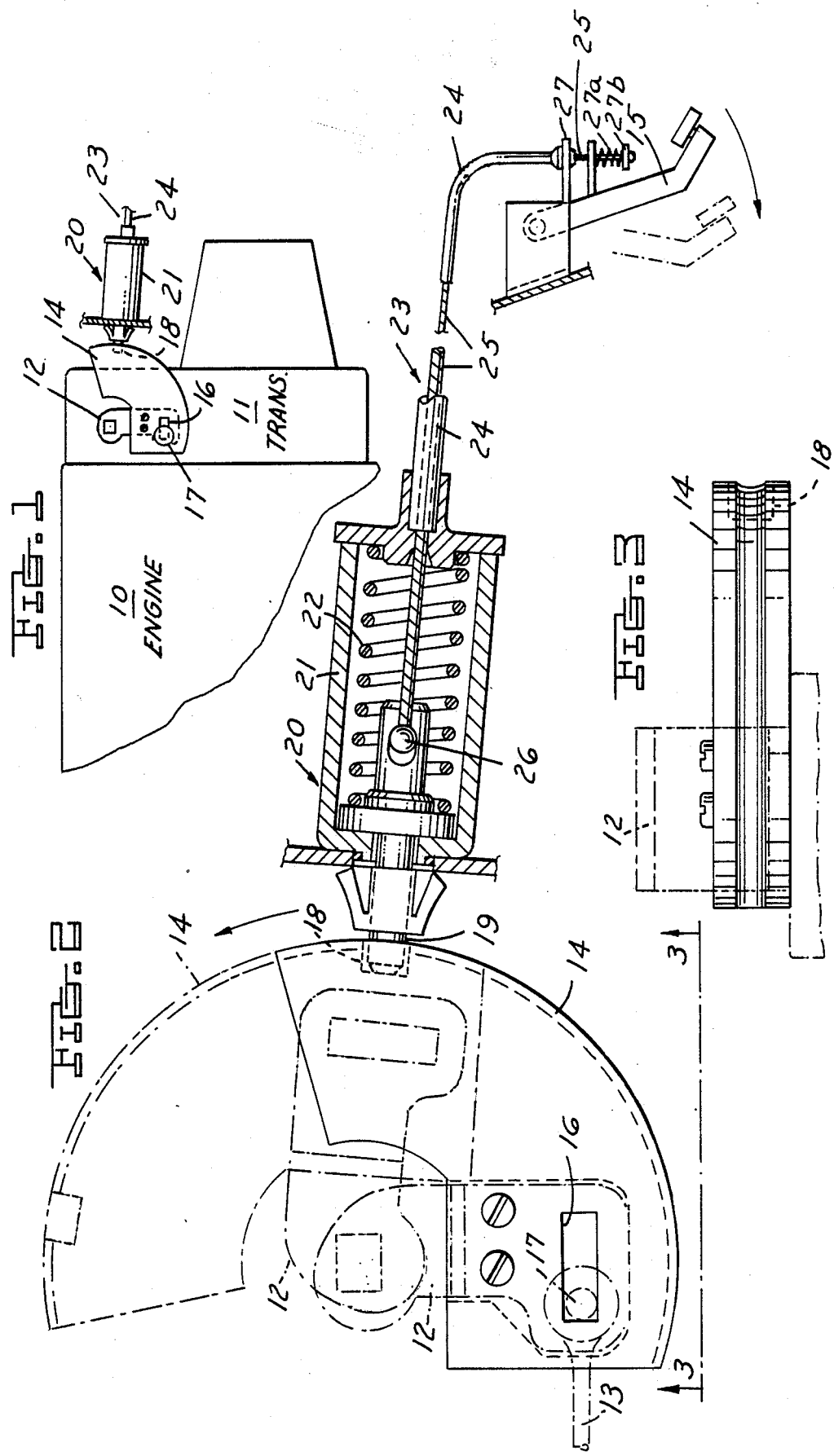

TRANSMISSION AND BRAKE INTERLOCK SYSTEM

This invention relates to automotive vehicles and particularly to interlock systems for preventing inadvertent placement of the transmission in a drive position.

BACKGROUND AND SUMMARY OF THE INVENTION

In automotive vehicles having automatic transmissions, it has been found desirable to provide an interlock system which will prevent shifting of the transmission out of park position especially when the vehicle engine is started.

Among of the objectives of the present invention are to provide a shifter and brake interlock system to prevent the automatic transmission from being shifted out of park unless the brake is first depressed; which system is less likely to result in the transmission functioning to move out of park position as a result of dimensional stack-ups; and which system is relatively simple and low in cost.

DESCRIPTION OF THE DRAWINGS

FIG. 1 is a partly diagrammatic view of a transmission embodying the invention.

FIG. 2 is a fragmentary view similar to FIG. 1 showing the system connected to the brake pedal.

FIG. 3 is a fragmentary view taken along the like 3—3 in FIG. 1.

DESCRIPTION

Referring to FIGS. 1-3, the engine 10 includes an automatic transmission 11 that has a shift lever 12 connected by linkage such as a cable 13 to the gear shift which may be on the steering column or mounted on the floor.

In accordance with the invention, a lock member 14 is mounted on the shift lever 12 which is pivoted to the transmission housing and means are provided between the brake pedal 15 and the lock member 14 to prevent the lock member from being shifted out of park position unless the brake pedal 15 is depressed to the broken line position as shown in FIG. 2.

The lock member 14 is bolted to the lever 12 and includes a slot 16 into which a pin 17 on the lever extends for fine adjustment of the position of the lock member 14 relative to the lever 12. The lock member includes a opening 18 in the periphery thereof into which a plunger 19 which is adapted to extend for holding the locking member 14 and in turn the shift lever 12 in the park position. The plunger 19 is a part of an assembly 20 that includes a housing 21 and a spring 22 yieldingly urging the plunger outwardly to the housing. A cable 23 including a conduit 24 and a strand 25 extends between the housing 20 and the brake pedal 15. The strand 25 is connected to the plunger 19 as by an enlargement such as a ball 26 affixed on one end. The other end of the strand is interconnected to a bracket 27 on the brake pedal 15.

A light spring 27a is interposed between bracket 27 and a washer 27b on a portion of brake pedal 15. The spring 27a has a lower rate (lesser spring force) than the spring 22. This takes up tolerances and provides automatic adjustment of the strand 25.

When the gear shift lever is moved to park position, the plunger 19 will engage the hole 18 and prevent movement of the lever 12 and in turn the shifting of the transmission out of park position.

When it is desired to shift the gear shift lever out of park position, the brake pedal 15 must first be depressed and then the gear shift lever can be moved.

By providing the locking mechanism in close proximity to the transmission lever on the transmission, there will be less likelihood that the transmission will be able to jump out of park as a result of dimensional stack-ups.

What is claimed:

1. In an automotive vehicle comprising a transmission, a transmission shift lever on said transmission housing, a gear shift lever on said vehicle, means interconnecting said gear shift lever and said transmission shift lever on said transmission, and a brake pedal, a transmission and brake interlock system comprising a lock member mounted directly on said transmission shift lever on the transmission housing for movement therewith, and an interlock means between mounted adjacent said lock member between the brake pedal of the automotive vehicle and the lock member operable to engage said lock member and prevent movement of the lock member and shifting of the transmission out of park position and operable to disengage said lock member when the brake pedal is depressed permitting the lock member to move and, in turn, the transmission lever to move to shift out of park position.

2. The system set forth in claim 1 wherein said interlock means comprises a housing, a plunger in said housing normally engaging said lock member, a spring yieldingly urging said plunger into engagement with said lock member, and a cable extending between the plunger and the brake pedal.

3. The system set forth in claim 2 including a second spring lighter than the first spring interposed between said brake pedal and said cable opposing said first mentioned spring, such as to take up tolerances and provide automatic adjustment for tolerances.

4. The system set forth in claim 3 including means disengageably connecting said plunger and said cable for connecting and disconnecting said cable to said plunger.

* * * * *